(12) United States Patent
Hyun et al.

(10) Patent No.: US 9,016,452 B2
(45) Date of Patent: Apr. 28, 2015

(54) DEVICE FOR GENERATING LIMIT TORQUE WITH FUNCTION OF YIELDING TORQUE CHANGE IN REAL TIME

(71) Applicants: Myung Ook Hyun, Gwacheon (KR); Sung Chul Kang, Seoul (KR); Jun Ho Choi, Seoul (KR); Seung Beum Suh, Seoul (KR)

(72) Inventors: Myung Ook Hyun, Gwacheon (KR); Sung Chul Kang, Seoul (KR); Jun Ho Choi, Seoul (KR); Seung Beum Suh, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 142 days.

(21) Appl. No.: 13/760,104

(22) Filed: Feb. 6, 2013

(65) Prior Publication Data

US 2013/0206535 A1 Aug. 15, 2013

(30) Foreign Application Priority Data

Feb. 10, 2012 (KR) .................. 10-2012-0013913

(51) Int. Cl.
*F16D 7/10* (2006.01)
*F16D 43/208* (2006.01)
*F16D 7/00* (2006.01)
F16D 28/00 (2006.01)

(52) U.S. Cl.
CPC *F16D 7/007* (2013.01); *F16D 7/10* (2013.01); *F16D 28/00* (2013.01); *F16D 43/208* (2013.01)

(58) Field of Classification Search
CPC .......... F16D 7/048; F16D 7/10; F16D 43/208
USPC .......................... 192/56.1, 56.3, 56.4; 464/37
See application file for complete search history.

(56) References Cited

U.S. PATENT DOCUMENTS

| 2,932,276 | A | * | 4/1960 | Fry, Jr. | 118/33 |
| 4,566,570 | A | * | 1/1986 | Geisthoff | 464/37 |
| 5,531,307 | A | * | 7/1996 | Fechter et al. | 192/56.4 |
| 5,916,325 | A | * | 6/1999 | Madrid et al. | 74/89.38 |
| 7,040,470 | B2 | * | 5/2006 | Dion | 192/56.3 |
| 7,335,107 | B2 | * | 2/2008 | Brosowske | 464/27 |

FOREIGN PATENT DOCUMENTS

| KR | 10-0853617 | 8/2008 |
| KR | 10-0861953 | 10/2008 |
| KR | 10-0987087 | 12/2009 |

* cited by examiner

*Primary Examiner* — Richard Lorence
(74) *Attorney, Agent, or Firm* — NSIP Law

(57) ABSTRACT

A device for generating limit torque with a function of yielding a torque change in real time includes a spring, a rotating portion having a cam surface formed therein, a transmitting portion transmitting an elastic force of the spring to the cam surface, a fixed portion with respect to which the relative rotation of the rotating portion is generated, and a limit-torque control portion provided to the fixed portion so as to control limit torque of the rotating portion by adjusting the elastic force of the spring. In the device, the limit-torque control portion controls the limit torque of the spring by changing the elastic force of the spring in real time.

23 Claims, 5 Drawing Sheets

DEVICE FOR GENERATING LIMIT TORQUE WITH FUNCTION OF YIELDING TORQUE CHANGE IN REAL TIME

CROSS-REFERENCE TO RELATED APPLICATION

Pursuant to 35 U.S.C. §119(a), this application claims the benefit of earlier filing date and right of priority to Korean Application No. 10-2012-0013913, filed on Feb. 10, 2012, the contents of which is incorporated by reference herein in its entirety.

BACKGROUND OF THE INVENTION

1. Field of the Invention

The present disclosure relates to a device for generating limit torque for a rotating mechanism, and particularly, to a device for protecting a rotating mechanism for performing a rotary motion by generating a rotational displacement when an external force having a certain torque or more is transmitted to the rotating mechanism, such as a joint of a robot manipulator.

2. Background of the Invention

A torque limiter for protecting a rotating mechanism for performing a rotary motion by generating a rotational displacement when an external force having a certain torque or more is transmitted to the rotating mechanism is provided to a joint of a robot manipulator, etc.

A conventional torque limiter is provided with a rotating portion and a fixed portion, and an elastic force of a spring between the rotating and fixed portions is generated when an external force is transmitted to the rotating portion. The elastic force of the spring blocks the rotation between the rotating and fixed portions until before the external force reaches limit torque. When the external force reaches the limit torque and is identical to or greater than the elastic force of the spring, a relative rotation of the rotating portion is generated with respect to the fixed portion.

The conventional torque limiter has a function of returning to its initial position after an external force generating a rotational displacement of the rotating portion is removed, but cannot deal with a random torque input according to changes of various environments and operating conditions. That is, the rotating portion is operated by only a specific external force defined by only the initial setup of the spring, and it is impossible to change limit torque with which the rotation of the rotating portion is started under various conditions.

Therefore, in the conventional torque limiter, the initial setup of the spring should be changed to change the limit torque, and hence the entire rotating mechanism should be disassembled.

SUMMARY OF THE INVENTION

Therefore, an aspect of the detailed description is to provide a device for generating limit torque which can be used in a joint connecting a member to be moved and a driving motor for driving the member to be moved, protect a rotating mechanism by generating a displacement to the rotating mechanism when an external force having limit torque or more is transmitted to the rotating mechanism, and actively deal with external input torque changed according to used environments and operational conditions.

Another aspect of the detailed description is to provide a device for generating limit torque which can ensure the safety of operators and mechanisms from an unexpected incident during the rotation of a link by absorbing an external force having a certain torque or more in a rotation driving portion.

To achieve these and other advantages and in accordance with the purpose of this specification, as embodied and broadly described herein, a device for generating limit torque with a function of yielding a torque change in real time includes a spring, a rotating portion having a cam surface formed therein, a transmitting portion transmitting an elastic force of the spring to the cam surface, a fixed portion with respect to which the relative rotation of the rotating portion is generated, and a limit-torque control portion provided to the fixed portion so as to control limit torque of the rotating portion by adjusting the elastic force of the spring. In the device, the limit-torque control portion controls the limit torque of the spring by changing the elastic force of the spring in real time.

The spring may be mounted to the fixed portion in a direction vertical to the axis direction of the fixed portion. One end of the spring may be connected to the transmitting portion, and the other end of the spring may be connected to the limit-torque control portion The compression or tensile displacement of the spring may be generated by an external force transmitted from the rotating portion. The compression or tensile displacement of the spring may be generated based on the shape of the cam surface according to the rotation of the rotating portion.

The limit torque of the spring may be determined by the linear or non-linear spring constant determined by a displacement of the limit-torque control portion and the compression or tensile displacement of the initial spring.

The transmitting portion may have a housing contacting the one end of the spring and a roller contacting the cam surface, and the roller is rotatably coupled to the housing. The transmitting portion may be positioned on a surface vertical to the axis direction of the fixed portion between the spring and the rotating portion.

The transmitting portion may be moved based on the compression or tensile displacement of the spring.

The transmitting portion may transmit the elastic force of the spring in a direction vertical to the cam surface at the contact point of the transmitting portion with the cam surface, and may be moved in the tangential direction of the cam surface so as to decrease a frictional force.

The transmitting portion may transmit, to the spring, torque generated by the external force with which the rotating portion is rotated. The torque generated by the external force transmitted from the spring from the transmitting portion may be changed depending on the shape of the cam surface.

The rotating portion may be spaced apart from an outer circumferential surface of the fixed portion at a predetermined interval, and the cam surface may be formed to be recessed on an inner circumferential surface of the fixed portion. The rotating portion may be connected to an external output shaft.

The rotating portion may generate a displacement of the transmitting portion according to the shape of the cam surface. The rotating portion may generate the limit torque according to the shape of the cam surface contacting the transmitting portion, and the free rotation of the rotating portion may be performed by the inner circumferential surface contacting the transmitting portion.

An inner circumferential surface of the rotating portion may allow the displacement of the spring to be maintained constant by the contact of the inner circumferential surface with the transmitting portion. The rotating portion may be further provided with a stopper protruded on the inner circumferential surface, and the stopper may limit the free rotation of the rotating portion, performed by the contact of the transmitting portion with the inner circumferential surface.

The limit torque may be changed depending on the shape of the cam surface contacting the transmitting portion.

The limit-torque control portion may have a linear motor and a lever, and the limit torque may be changed in real time by driving the linear motor.

The lever may contact an end portion of the spring, and the contact point between the linear motor and the lever may be further spaced apart from the rotating shaft of the lever as compared with that between the spring and the lever.

The position (or rotation degree) of the lever may be determined by only a displacement of the linear motor.

The limit-torque control portion may support the spring so that the relative position between the fixed portion and the rotating portion is maintained within the limit torque.

The limit-torque control portion may increase/decrease the limit torque in real time by changing the compression or tensile displacement of the spring through the real-time driving of the linear motor.

The device may further include a controller changing the limit torque in real time by controlling the linear motor.

According to the device configured as described above, the determination of limit torque according to the spring can be performed by simply controlling and operating the linear motor, so that it is possible to perform a simple operation of the device and to reduce time and cost.

Also, as various limit torque can be controlled in real time, the device can actively and quickly deal with the limit torque under external environments and conditions by changing the limit torque in real time. Accordingly, it is possible to ensure the safety of operators and mechanisms from an unexpected incident during operation.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
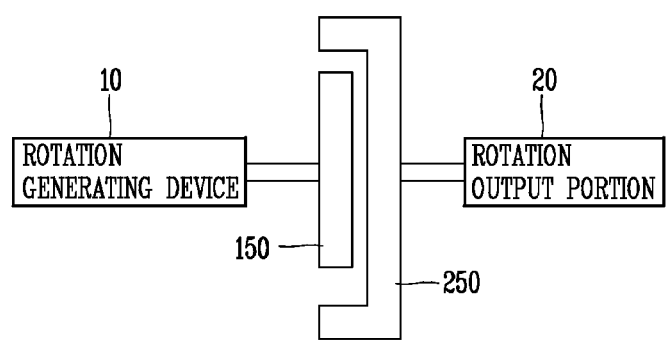
FIG. 1 is a schematic view of a rotating mechanism to which a device for generating limit torque is mounted.

FIG. 1 schematically shows a position at which a device for generating limit torque is mounted to a rotating mechanism.

Referring to FIG. 1, the rotating mechanism such as a robot has a rotation generating device 10 generating a rotational force and a rotation output portion 20 outputting rotation. Here, the rotational force refers to a force acting for the purpose of a normal operation, but does not refer to a rotational force generated by an unintended external force which will be described later.

The rotation generating device 10 is provided a motor, etc., to generate a rotational force. The rotational force generated by the rotation generating device 10 is transmitted to the rotation output portion 20 by a joint. The joint is configured by engaging a rotor 150 connected to the rotation generating device 10 and a stator 250 connected to the rotation output portion 20 with each other. The device according to the exemplary embodiment is provided with the rotor 150 and the stator 250.

If an external force transmitted to the rotation output portion 20 is limit torque or more, the device is operated to block the limit torque or more from being transmitted to the rotation generating device 10. Therefore, the rotor 150 becomes a fixed portion and the stator 250 becomes a rotating portion, based on the external force. Hereinafter, the rotor and the stator are referred to as a fixed portion 150 and a rotating portion 250, respectively.

Figure 2:
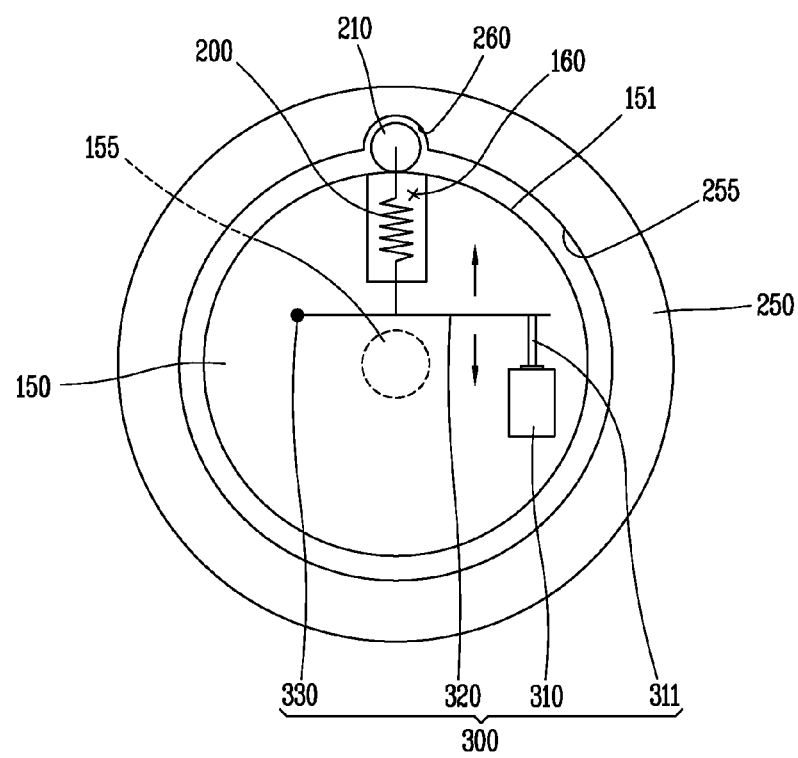
FIG. 2 is a schematic view showing an exemplary embodiment of the device for generating limit torque.

FIG. 2 shows an exemplary embodiment of the device for generating limit torque according to an exemplary embodiment.

Referring to FIG. 2, the device according to the exemplary embodiment includes a spring 200, a rotating portion 250 having a cam surface 260 formed therein, a transmitting portion 210 transmitting an elastic force of the spring 200 to the cam surface 260, a fixed portion 150 with respect to which a relative rotation of the rotating portion 250 is generated, and a limit-torque control portion 300 provided to the fixed portion 150 so as to control limit torque of the rotating portion 250 by adjusting the elastic force of the spring 200.

The fixed portion 150 is connected to the rotation generating device 10 to be protected. Accordingly, the spring 200 generating limit torque for protecting the rotation generating device 10, the transmitting portion 210 and the limit-torque control portion 300 are provided to the fixed portion 150.

The fixed portion 150 may be formed in a disk shape, and a rotating shaft 155 connected to the rotation generating device 10 is connected to the center of the fixed portion 150. The spring 200, the transmitting portion 210 and the limit-torque control portion 300, provided to the fixed portion 150 are provided to generate limit torque in a radius direction of the fixed portion 150 about the rotating shaft 155.

The spring 200 is configured as a compression spring, and may be mounted to the fixed portion 150 in the state in which the spring 200 is compressed by a predetermined length according to an initial setup. Therefore, the spring 200 is mounted at a neutral position in the state that the spring 200 has an initial restoring force. The initial compression force of the spring 200 acts on the cam surface 260 of the rotating portion 250, which will be described later, so that the spring 200 presses the rotating portion 250.

The spring 200 is mounted to the fixed portion 150 in a radius direction vertical to the axis direction of the fixed portion 150. One end of the spring 200 is connected to the transmitting portion 210, and the other end of the spring 200 is connected to the limit-torque control portion 300. More specifically, the other end of the spring 200 is connected to a lever 320 of the limit-torque control portion 300.

A compression or tensile displacement of the spring 200 may be generated by an external force transmitted from the rotating portion 250. That is, the compression or tensile displacement of the spring 200 is generated based on the shape of the cam surface 260 according to the rotation of the rotating portion 250.

The limit torque generated by the spring 200 is determined by the linear or non-linear spring constant determined by a displacement of the limit-torque control portion 300 and the compression or tensile displacement of the initial spring.

The transmitting portion 210 may transmit the limit torque generated by the spring 200 to the rotating portion 250, and may transmit the external force transmitted to the rotating portion 250 to the spring 200.

Figure 3:
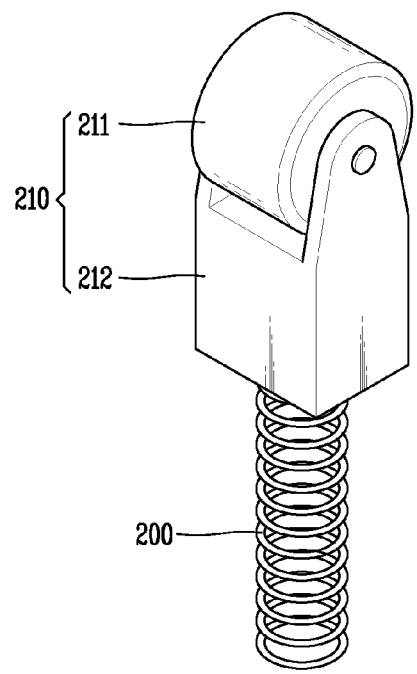
FIG. 3 is a perspective view of a transmitting portion for transmitting limit torque of a spring to a rotating portion.

FIG. 3 shows in detail the transmitting portion 210.

Referring to FIG. 3, the transmitting portion 210 includes a housing 212 contacting the one end of the spring 200 and a roller 211 contacting the cam surface 260. The roller 211 is rotatably coupled to the housing 212. The one end of the spring 200 is accommodated in an accommodating space formed in the housing 212 so that the coupling between the spring 200 and the transmitting portion 210 is maintained.

The transmitting portion 210 is positioned on a surface vertical to the axis direction of the fixed portion 150 between the spring 200 and the rotating portion 250. That is, the transmitting portion 210 is provided to be movable in the radius direction of the fixed portion 150. Accordingly, the transmitting portion 210 may be moved based on the compression or tensile displacement of the spring 200. That is, the transmitting portion 210 transmits the external force transmitted by the rotating portion 250 to the spring 200.

The torque generated by the external force transmitted to the spring 200 is changed depending on the shape of the cam surface 260. That is, the torque of the external force acting on the spring 200 is changed depending on the angle made by a line of action of the torque, on which the external force is transmitted through the contact between the cam surface 260 and the roller 211 of the transmitting portion 210, and a displacement generation line of the spring 200.

The transmitting portion 210 transmits an elastic force of the spring 200 in a direction vertical to the cam surface 260 at the contact point of the transmitting portion 210 with the cam surface 260, and is moved in the tangential direction of the cam surface 260 so as to decrease a frictional force. That is, the roller 211 provided to the transmitting portion 210 contacts the cam surface 260 and transmits the elastic force of the spring 200 in the direction vertical to the cam surface 260 through the point contact of the roller 211 with the cam surface 260. Since the rotation of the roller 211 is possible with respect to the cam surface 260, the roller 211 is moved by rolling in the tangential direction of the cam surface 260. Accordingly, it is possible to decrease the frictional force generated when the roller 211 contacts the cam surface 260. The mechanical action of the transmitting portion 210 with respect to the cam surface 260 functions to transmit the limit torque generated by the spring 200 to the rotating portion 250.

Meanwhile, a guide groove 160 guiding an operating path of the spring 200 and the transmitting portion 210 may be formed in the fixed portion 150. The guide groove 160 may be formed in the radius direction of the fixed portion 150 so as to guide the path when the spring 200 is compressed or when the transmitting portion 210 is moved by the contact of the transmitting portion 210 with the cam surface 260. The guide groove 160 may also provide a space in which the transmitting portion 210 is accommodated after the spring 200 is compressed and the transmitting portion 210 is then moved to the fixed portion 150.

Referring to FIG. 2, the rotating portion 250 is formed in a disk shape, and an accommodating space for accommodating the fixed portion 150 is formed in the inside of the rotating portion 250. The rotating portion 250 is connected to the rotation output portion 20, and receives an external force transmitted through the rotation output portion 20 and then transmits the received external force to the fixed portion 150. If the external force becomes limit torque or more, the rotating portion 250 can be rotated with respect to the fixed portion 150.

An inner circumferential surface 255 of the rotating portion 250 is spaced apart from an outer circumferential surface 151 of the fixed portion 150 at a predetermined interval. The cam surface 260 is formed to be recessed on the inner circumferential surface 255.

The rotating portion 250 generates a displacement of the transmitting portion 210 according to the shape of the cam surface 260. That is, the rotating portion 250 generates limit torque according to the shape of the cam surface 260 contacting the roller 211 of the transmitting portion 210, and transmits an external force.

In FIG. 2, the cam surface 260 is formed in a semi-circular shape. However, the shape of the cam surface 260 is provided for illustrative purposes, and may be variously modified. For example, the cam surface 260 may be formed in a polygonal shape such as a trapezoid shape. The shape of the cam surface 260 may be changed depending on a user's setup and a desired limit torque.

The limit torque is changed depending on the shape of the cam surface 260 contacting the transmitting portion 210. This is because the elastic force formed by the spring 200 is transmitted to the cam surface 260 through the roller 211 of the transmitting portion 210, and therefore, the limit torque in the direction of blocking the rotation of the rotating portion 250 is changed depending on the shape of the cam surface 260 contacting the roller 211 of the transmitting portion 210.

Figure 4:
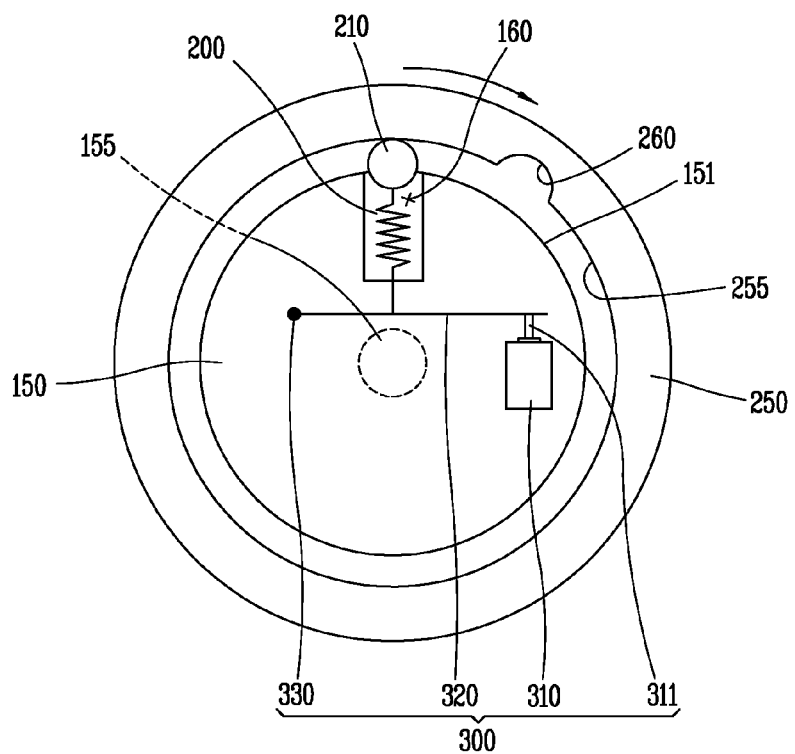
FIG. 4 is an operational view showing a state in which an external force having limit torque or more is applied to the rotating portion.

FIG. 4 shows a state in which the external force transmitted to the rotating portion 250 exceeds the limit torque, and the rotating portion 250 is rotated with respect to the fixed portion 150.

Referring to FIG. 4, if the external force exceeds the limit torque, the contact of the transmitting portion 210 with the cam surface 260 is released, and contacts the inner circumferential surface 255 of the rotating portion 250.

The roller 211 of the transmitting portion 210 performs a rolling motion on the inner circumferential surface 255 of the rotating portion 250, and the free rotation of the rotating portion 250 is possible with respect to the fixed portion 150. That is, the free rotation of the rotating portion 250 can be performed by the inner circumferential surface 255 of the rotating portion 250 contacting the transmitting portion 210.

The inner circumferential surface 255 of the rotating portion 250 is spaced apart from the outer circumferential surface 151 of the fixed portion 150 at the predetermined interval. The inner circumferential surface 255 of the rotating portion 250 is formed to have a constant curvature. Accordingly, the inner circumferential surface 255 of the rotating portion 250 can allow the displacement of the spring 200 to be maintained constant by the contact of the inner circumferential surface 255 with the transmitting portion 210.

Figure 5:
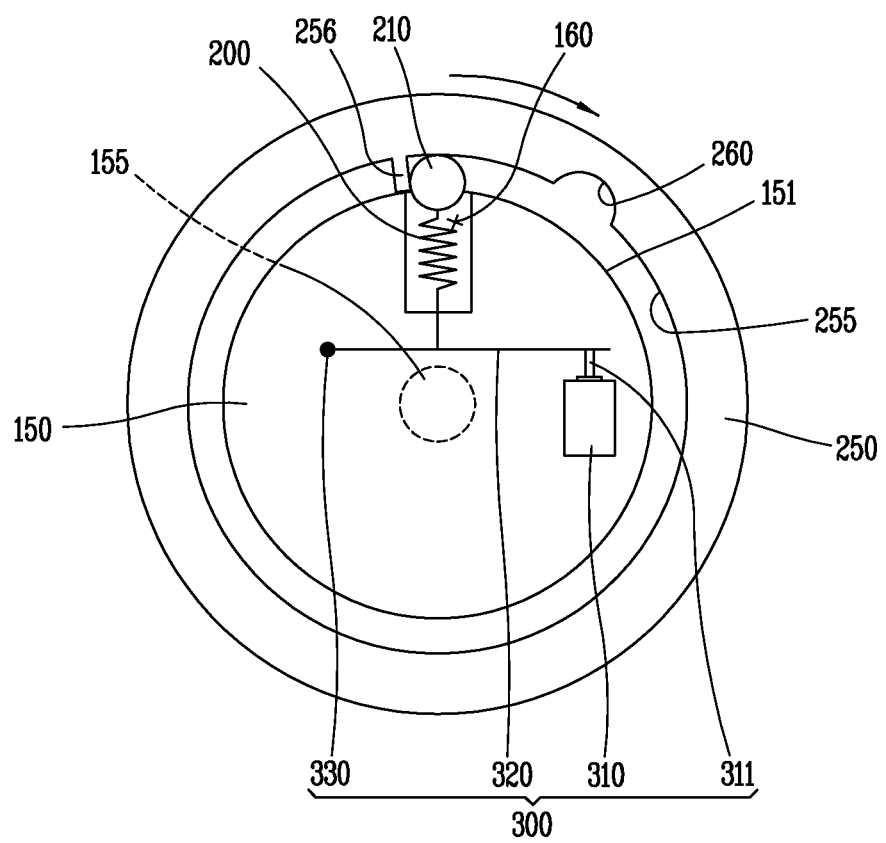
FIG. 5 is a schematic view showing a configuration for limiting free rotation of the rotating portion.

FIG. 5 shows a stopper capable of limiting free rotation of the rotating portion 250 within a certain range.

Referring to FIG. 5, the rotating portion 250 further includes a stopper 256 protruded on the inner circumferential surface 255 thereof, and the stopper 256 may limit the free rotation of the rotating portion 250, performed by contacting the inner circumferential surface 255 of the rotating portion 250. Accordingly, the stopper 256 limits an excessive rotation of the rotating portion 250, so that it is possible to prevent damage of an electric wire, etc. provided to the rotating mechanism and to allow the restoration of the initial position of the rotating portion 250 to be smoothly performed.

The limit-torque control portion 300 is connected to the spring 200 so as to control the limit torque of the spring 200 by changing the elastic force of the spring 200 in real time. Referring to FIG. 2, the limit-torque control portion 300 includes a linear motor 310 and a lever 320.

The linear motor 310 is a component that functions to change the limit torque in real time by controlling the initial compression displacement of the spring 200. The linear motor 310 is provided with a rod performing a straight-line motion, and controls, in real time, the displacement of the rod under the control of a controller (not shown) which will be described later.

One end of the lever 320 is connected to a rotating shaft 330 of the lever 320, fixed to the fixed portion 150, and the other end of the lever 320 is connected to the rod 311 of the linear motor 310. The one end of the spring 200 is connected to the lever 320 between the rotating shaft 330 and the rod 311.

The lever 320 transmits a displacement of the rod 311 to the spring 200. Since the spring 200 is positioned in the radius direction of the fixed portion 150, the space in which the linear motor 310 is directly connected to the spring 200 by the rotating shaft 155 of the fixed portion 150 is narrow. Accordingly, it is necessary to use the lever 320 for the purpose of securing the mounting space of the linear motor 310.

The lever 320 contacts an end portion of the spring 200, and the contact point between the linear motor 310 and the lever 320 is further spaced apart from the rotating shaft 330 of the lever 320 as compared with that between the spring 200 and the lever 320. Accordingly, the number of times of generating the displacement of the spring 200 is smaller than that of generating the displacement of the rod 311 of the linear motor 310, so that it is possible to decrease an error caused by the displacement of the spring 200. Thus, the displacement of the spring 200 can be more precisely controlled.

The limit torque generated by the spring 200 through the driving of the linear motor 310 may be changed in real time. More specifically, the limit-torque control portion 300 can increase/decrease the limit torque in real time by changing the compression or tensile displacement of the spring 200 through the real-time driving of the linear motor 310.

Figure 6:
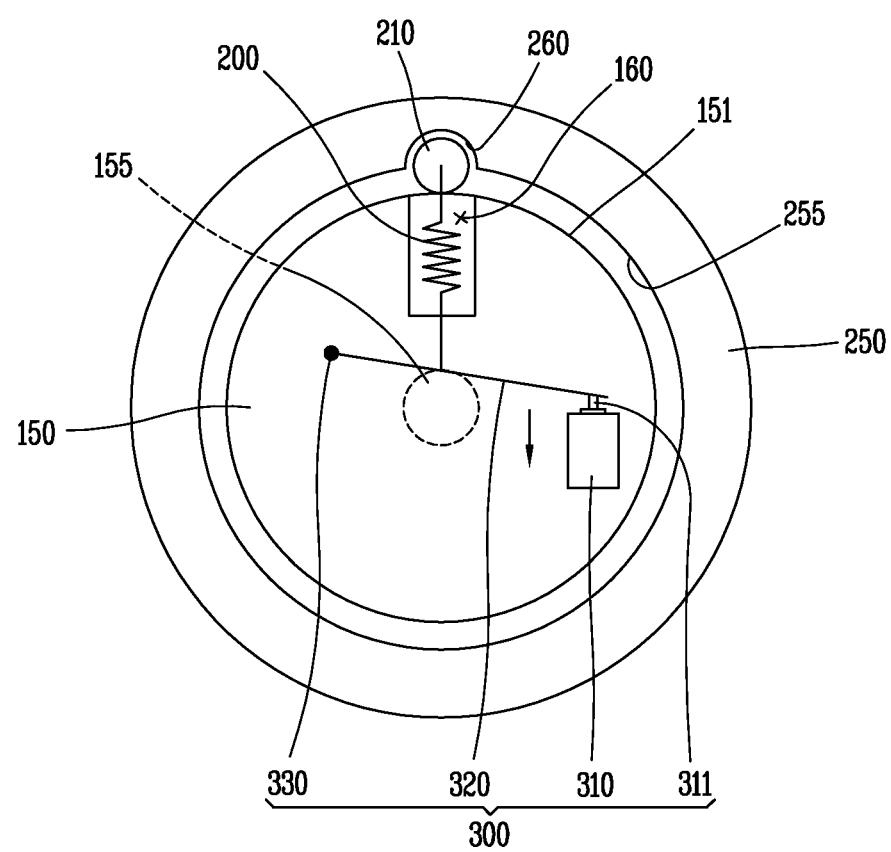
FIGS. 6 and 7 are operational views showing a limit-torque control performed by a limit-torque control portion.
Figure 7:
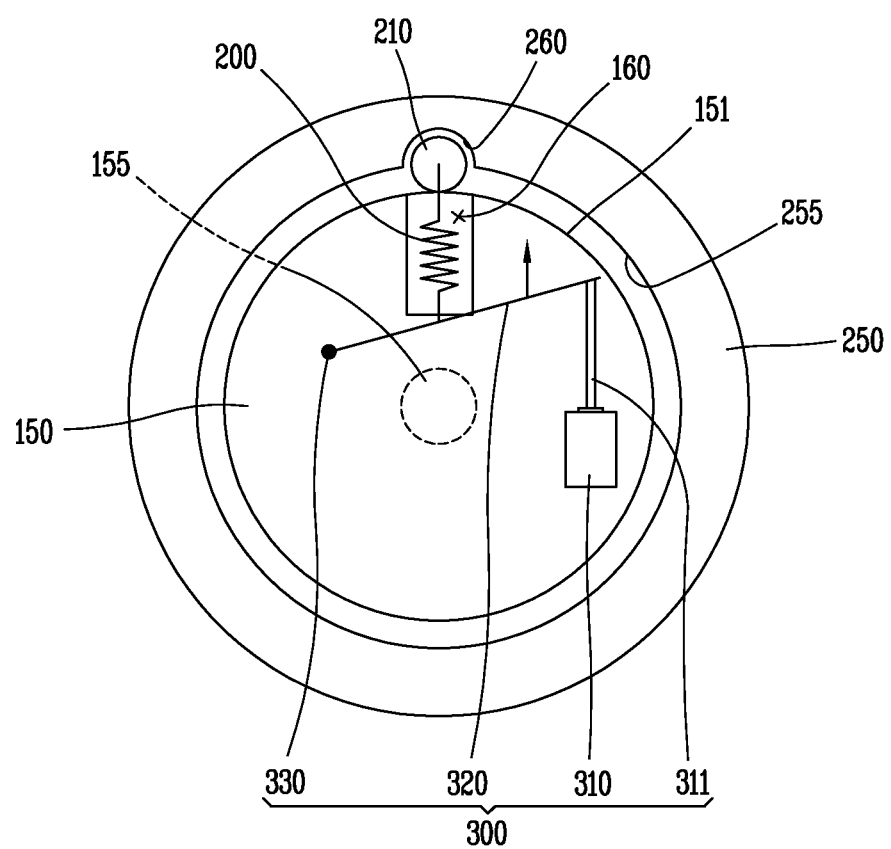

FIGS. 6 and 7 show a limit-torque control performed by the linear motor 310.

In FIG. 6, the limit torque is decreased by reducing the initial compression displacement of the spring 200 through the linear motor 310. Referring to FIG. 6, if the linear motor 310 is operated to reduce the displacement of the rod 311, the spring 200 is extended by the lever 320 so that the initial compression displacement of the spring 200 is reduced. Accordingly, the initial elastic force of the spring 200 is decreased, and thus the limit torque transmitted to the rotating portion 250 is decreased.

In FIG. 7, the limit torque is increased by enlarging the initial compression displacement of the spring 200 through the linear motor 310. Referring to FIG. 7, the linear motor 310 is operated to enlarge the placement of the rod 311, the spring 200 is compressed by the lever 320 so that the initial compression displacement of the spring 200 is enlarged. Accordingly, the initial elastic force of the spring 200 is increased, and thus the limit torque transmitted to the rotating portion 250 is increased.

Meanwhile, the separate controller (not shown) may be provided to change the limit torque in real time by controlling the linear motor 310. As described above, the controller is electrically connected to the linear motor 310 so as to control the displacement of the rod 311. The limit torque may be controlled by adjusting the displacement of the rod 311 when the initial limit torque is set, or the limit torque may be controlled suitable for a real-time situation.

The position (or rotation degree) of the lever 320 may be determined by only the displacement of the rod 311 through the linear motor 310. That is, although the external force acts on the spring 200 by being transmitted to the rotating portion 250, the position or rotation degree of the lever 320 is not changed but fixed.

The limit-torque control portion 300 supports the spring 200 so that the relative position between the fixed portion 150 and the rotating portion 250 is maintained within the limit torque. That is, the external force transmitted to the rotating portion 250 maintains the rotating portion 250 not to be rotated with respect to the fixed portion 150 within the limit torque by supporting and fixing the spring 200.

According to the device configured as described above, the determination of limit torque according to the spring can be performed by simply controlling and operating the linear motor, so that it is possible to perform a simple operation of the device and to reduce time and cost.

Further, as various limit torque can be controlled in real time, the device can actively and quickly deal with the limit torque under external environments and conditions by changing the limit torque in real time. Accordingly, it is possible to ensure the safety of operators and mechanisms from an unexpected incident during operation.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A device for generating limit torque with a function of yielding a torque change in real time, the device comprising:
   a spring;
   a rotating portion having a cam surface formed therein;
   a transmitting portion configured to transmit an elastic force of the spring to the cam surface;
   a fixed portion having a fixed position with respect to a relative rotation of the rotating portion when a limit torque of the rotating portion is exceeded; and a limit-torque control portion provided to the fixed portion and configured to control the limit torque of the rotating portion by adjusting the elastic force of the spring, wherein the limit-torque control portion has a linear motor and a lever and the limit torque is changed in real time by driving the linear motor.

2. The device of claim 1, wherein the spring is mounted to the fixed portion in a radial direction relative to an axis direction of the fixed portion.

3. The device of claim 2, wherein one end of the spring is connected to the transmitting portion and the other end of the spring is connected to the limit-torque control portion.

4. The device of claim 2, wherein a compression or tensile displacement of the spring is generated by an external force transmitted from the rotating portion.

5. The device of claim 4, wherein the compression or tensile displacement of the spring is generated based on the shape of the cam surface according to the rotation of the rotating portion.

6. The device of claim 1, wherein the limit torque of the rotating portion is determined by a linear or non-linear spring constant determined by a displacement of the limit-torque control portion and a compression or tensile displacement of the spring.

7. The device of claim 1, wherein:
the transmitting portion has a housing contacting one end of the spring and a roller contacting the cam surface, and the roller is rotatably coupled to the housing.

8. The device of claim 1, wherein the transmitting portion is positioned on a surface perpendicular to an axis direction of the fixed portion between the spring and the rotating portion.

9. The device of claim 1, wherein the transmitting portion is moved based on a compression or tensile displacement of the spring.

10. The device of claim 1, wherein the transmitting portion transmits the elastic force of the spring in a direction perpendicular to the cam surface at a contact point of the transmitting portion with the cam surface and is moved in a tangential direction of the cam surface so as to decrease a frictional force.

11. The device of claim 1, wherein the transmitting portion transmits, to the spring, a portion of an external force with which the rotating portion is rotated.

12. The device of claim 11, wherein torque generated by the external force is changed depending on the shape of the cam surface.

13. The device of claim 1, wherein:
the rotating portion is spaced apart from an outer circumferential surface of the fixed portion at a predetermined interval, and
the cam surface is formed to be recessed on an inner circumferential surface of the rotating portion.

14. The device of claim 13, wherein:
the rotating portion generates the limit torque according to the shape of the cam surface contacting the transmitting portion, and
the inner circumferential surface of the rotating portion contacts the transmitting portion.

15. The device of claim 14, wherein the inner circumferential surface of the rotating portion allows a displacement of the spring to be maintained constant by the contact of the inner circumferential surface with the transmitting portion.

16. The device of claim 15, wherein:
the rotating portion is further provided with a stopper protruded on the inner circumferential surface, and
the stopper limits free rotation of the rotating portion, performed by the contact of the transmitting portion with the inner circumferential surface.

17. The device of claim 14, wherein the limit torque is changed depending on the shape of the cam surface contacting the transmitting portion.

18. The device of claim 1, wherein the rotating portion is connected to an external output shaft.

19. The device of claim 1, wherein the rotating portion generates a displacement of the transmitting portion according to the shape of the cam surface.

20. The device of claim 1, wherein:
the lever contacts an end portion of the spring, and
a contact point between the linear motor and the lever is further spaced apart from a rotating shaft of the lever as compared with spacing between the spring and the lever.

21. The device of claim 20, wherein a position or rotation degree of the lever is determined by only a displacement of the linear motor.

22. The device of claim 1, wherein the limit-torque control portion supports the spring so that a relative position between the fixed portion and the rotating portion is maintained within the limit torque.

23. The device of claim 1, wherein the limit-torque control portion increases/decreases the limit torque in real time by changing a compression or tensile displacement of the spring through the real-time driving of the linear motor.

* * * * *